(12) United States Patent
Wu

(10) Patent No.: US 6,394,124 B1
(45) Date of Patent: May 28, 2002

(54) WATER PASSAGE SPLITTER STRUCTURE OF A WATER TAP

(76) Inventor: Cheng-Wsiung Wu, No. 71, Tsao Kang Land, Tsao Chung Li, Lu Kang Town, Changhua Country (TW)

( * ) Notice: Subject to any disclaimer, the term of this patent is extended or adjusted under 35 U.S.C. 154(b) by 0 days.

(21) Appl. No.: 09/785,183

(22) Filed: Feb. 20, 2001

(51) Int. Cl.⁷ .................................................. G05D 7/01
(52) U.S. Cl. ................................................. 137/119.04
(58) Field of Search ...................... 137/119.03, 119.04, 137/119.06

(56) References Cited

U.S. PATENT DOCUMENTS

| | | | | |
|---|---|---|---|---|
| 2,314,071 A | * | 3/1943 | Bucknell et al. | 137/119.04 |
| 4,798,221 A | * | 1/1989 | Crawford et al. | 137/119.04 |
| 5,752,541 A | * | 5/1998 | Gonzalez | 137/119.04 |

* cited by examiner

Primary Examiner—Stephen M. Hepperle
(74) Attorney, Agent, or Firm—Rabin & Berdo, P.C.

(57) ABSTRACT

The present invention discloses the structure of a water passage splitter of a water tap that can automatically switch on or off the water passage. Such water switch is disposed inside the valve of a water tap, and the water switch assembly comprises a valve element, a valve rod, a fixing bracket, a baffle cover, and an external washer. The valve rod is disposed inside the valve element, and the internal stopper, fixing bracket, baffle cover, and external washer are arranged in sequential order from the front end to the back end; wherein the fixing bracket newly added to the present invention comprises a plurality of small protruding dots and a plurality of ringlike concave surfaces, and they are disposed between the internal stopper and the baffle cover. When switching the passage of the water supply, the fixing bracket can timely provide the flowing pressure of the water supply. When the pressure of the water flow is made up for, it can increase the sealing effect at the locations where water is not supplied in order to prevent leakage, and enhance the control of the water passage switch.

1 Claim, 5 Drawing Sheets

WATER PASSAGE SPLITTER STRUCTURE OF A WATER TAP

BACKGROUND OF THE INVENTION

1. Field of the Invention

The present invention relates to the structure of a water passage splitter, more particularly to the structure of a water passage splitter being disposed inside the valve faucet of a water tap.

2. Description of the Related Art

In general, the conventional water switch structure of a water tap has leakage at the water stopper. Therefore, the present invention intends to improve such shortcoming by providing a non-leaking stopper.

SUMMARY OF THE INVENTION

The primary objective of the present invention is to add a choke plate to the water passage switch. When the passage of the water supply is switched, the choke plate can timely provide the flowing pressure for the water supply. When such pressure is compensated, it can increase the sealing effect at the locations where water is not supplied in order to prevent leakage, and enhance the control of the water passage switch.

To make it easier for our examiner to understand the objective of the invention, its structure, innovative features, and its performance, we use a preferred embodiment together with the attached drawings for the detailed description of the invention.

BRIEF DESCRIPTION OF THE DRAWINGS

Other objects, features, and advantages of the invention will become apparent from the following detailed description of the preferred but non-limiting embodiment. The description is made with reference to the accompanying drawings, in which.

DETAILED DESCRIPTION OF THE PREFERRED EMBODIMENTS

Figure 1:
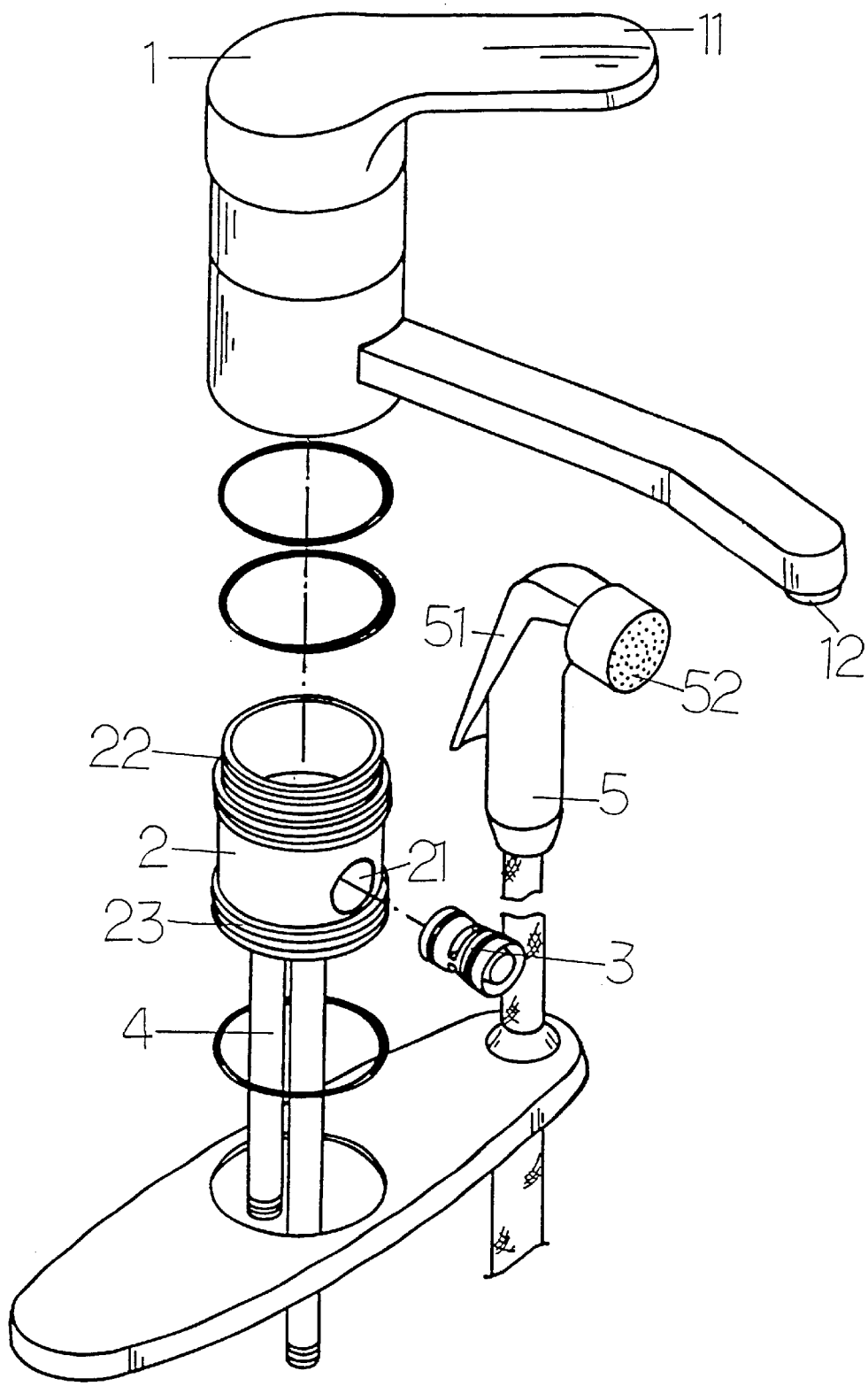
FIG. 1 shows the dissembled parts of the water tap according to the present invention.
Figure 2:
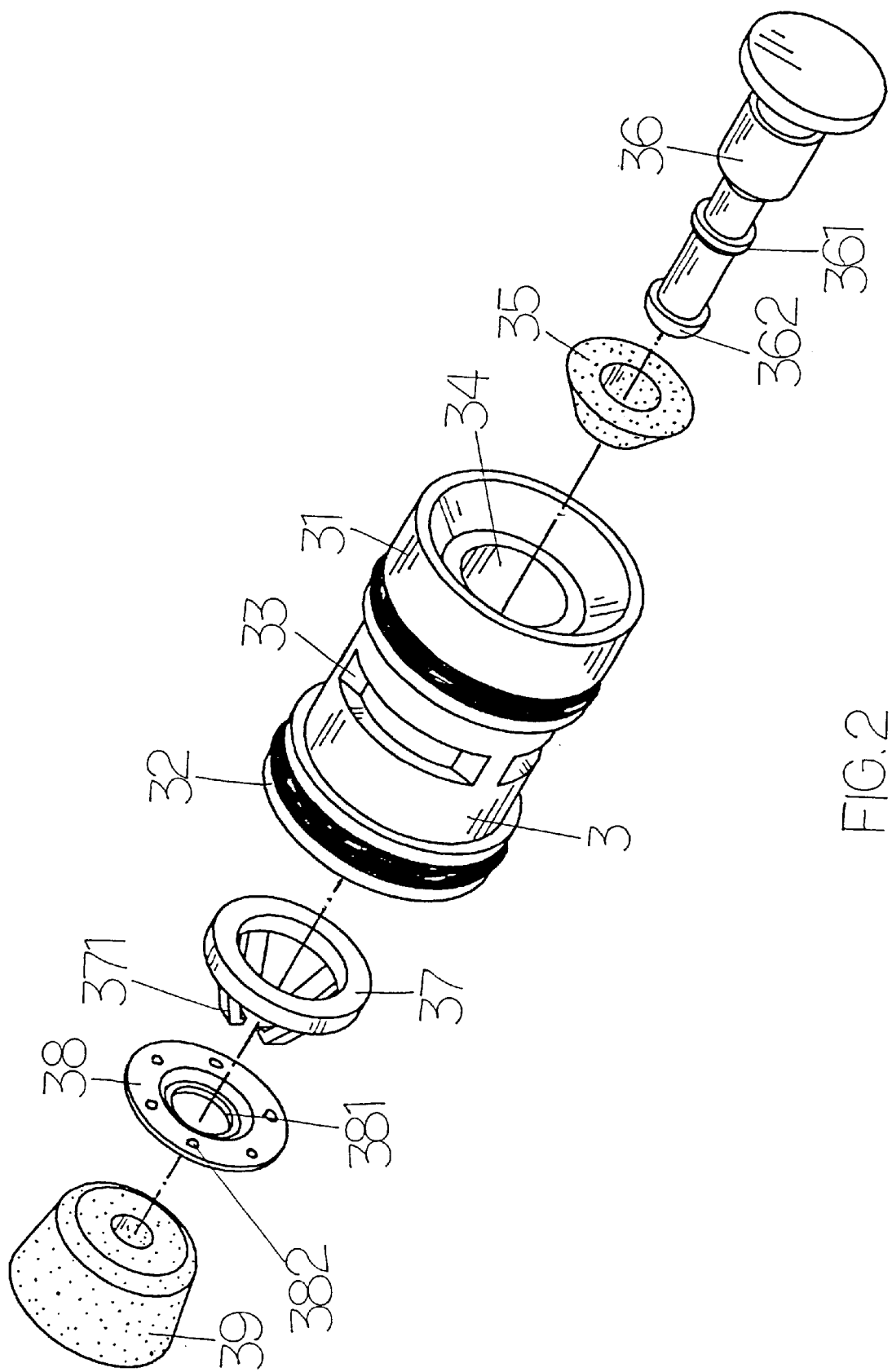
FIG. 2 shows the dissembled parts of the water splitting valve of the water tap according to the present invention.

Please refer to FIG. 1 for a water passage splitter structure of a water tap according to a preferred embodiment of the present invention. The water tap 1 comprises a valve 2 being disposed under the water tap 1, a valve element 3, a plurality of splitting pipes 4, a sprinkler 5, and a water controlling switch of the valve element 3. Please refer to FIG. 2. Both the front end and the rear end of the valve element 3 have a ringed water washer 32, 34 having a plurality of open cuts at their center. The valve element is a hollow valve hole 34 with a valve rod 36 passing through it, and it has a upper stopping end 362 at the front end, and a ringed protruding rib 361 between both ends. An external water stopper 35 is sleeved into the rear end of the valve rod 36. When the valve rod 36 passes through the valve hole 34 of the valve element 3, the ringed protruding rib 361 is sleeved with the baffle cover 37 at the front end of the ringed protruding rib 361. The internal water stopper 39 is sleeved between the ringed protruding rib 361 and the upper blocking end 362. There is a choke plate 38 between the baffle cover 37 and the internal water stopper 39, and the choke plate 38 has a ringed concave surface inside that will be sleeved onto the ringed protruding rib 361. There are a plurality of tiny dots 382 on its surface, and the opposite of the tiny dots 382 are in the shape of tiny bores. The tiny dots 382 can press again the surface of the internal water stopper 39 and make the internal water stopper 39 to have the stability and will not tilt to a side. It further attains the effect of compensating the water pressure by means of the choke plate 38, such that the valve rod 36 will be pulled forward to increase the water stopping effect.

Figure 3:
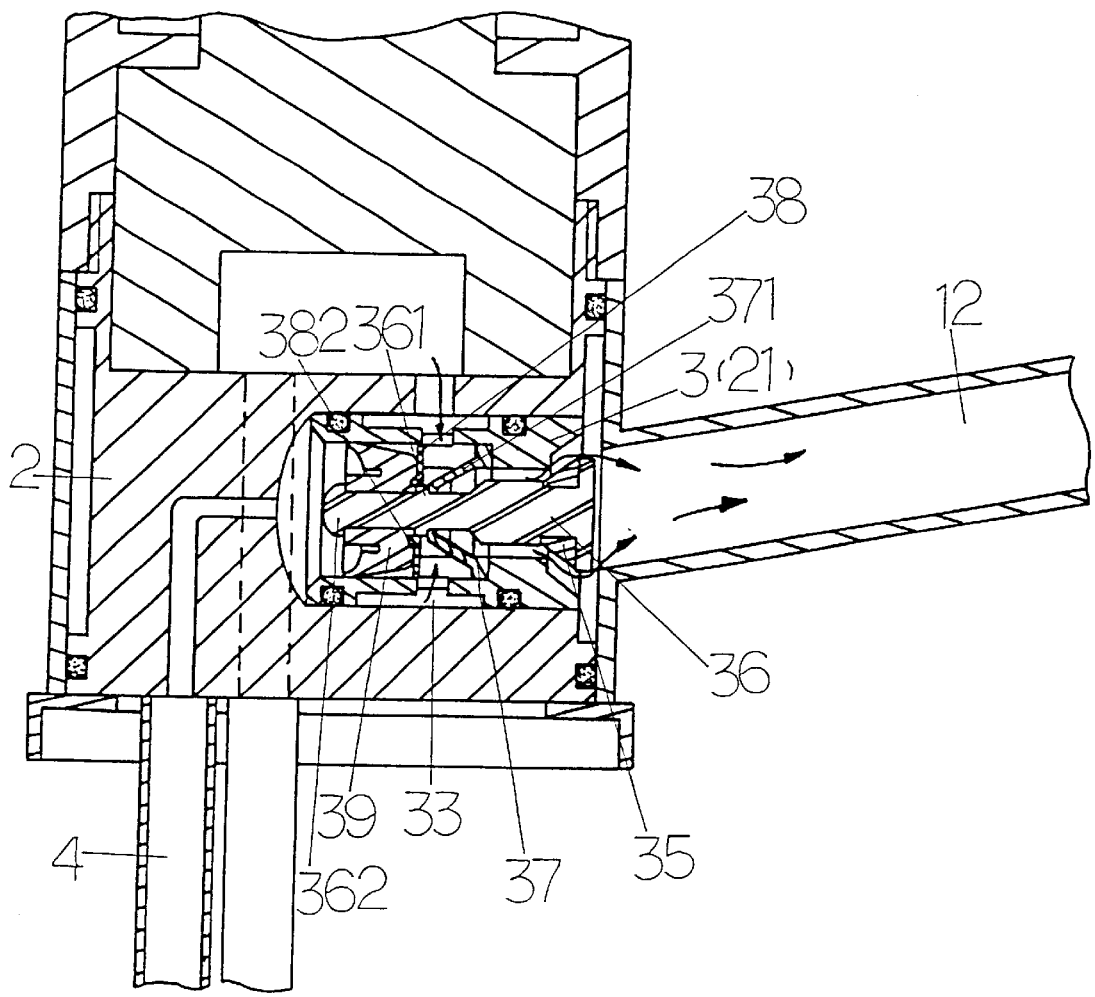
FIG. 3 shows the cross-section of the water splitter of the water tap according to the present invention when it is partially in use.

Please refer to FIG. 3. It shows a water passage splitter structure of a water tap according to the present invention. When the switch 11 of the water tap 1 is on, there is a concave groove 21 on the valve 2, and the water splitting valve element penetrates into the concave groove 21, the internal water stopper 39 in one end of the water splitting valve element 3 is pressed by the pressure of the water flow and it causes one end of the valve to be in the closed status, and the other end in open status. Therefore, the water will flow along the direction from the outlet 12 of the water tap 1.

Figure 4:
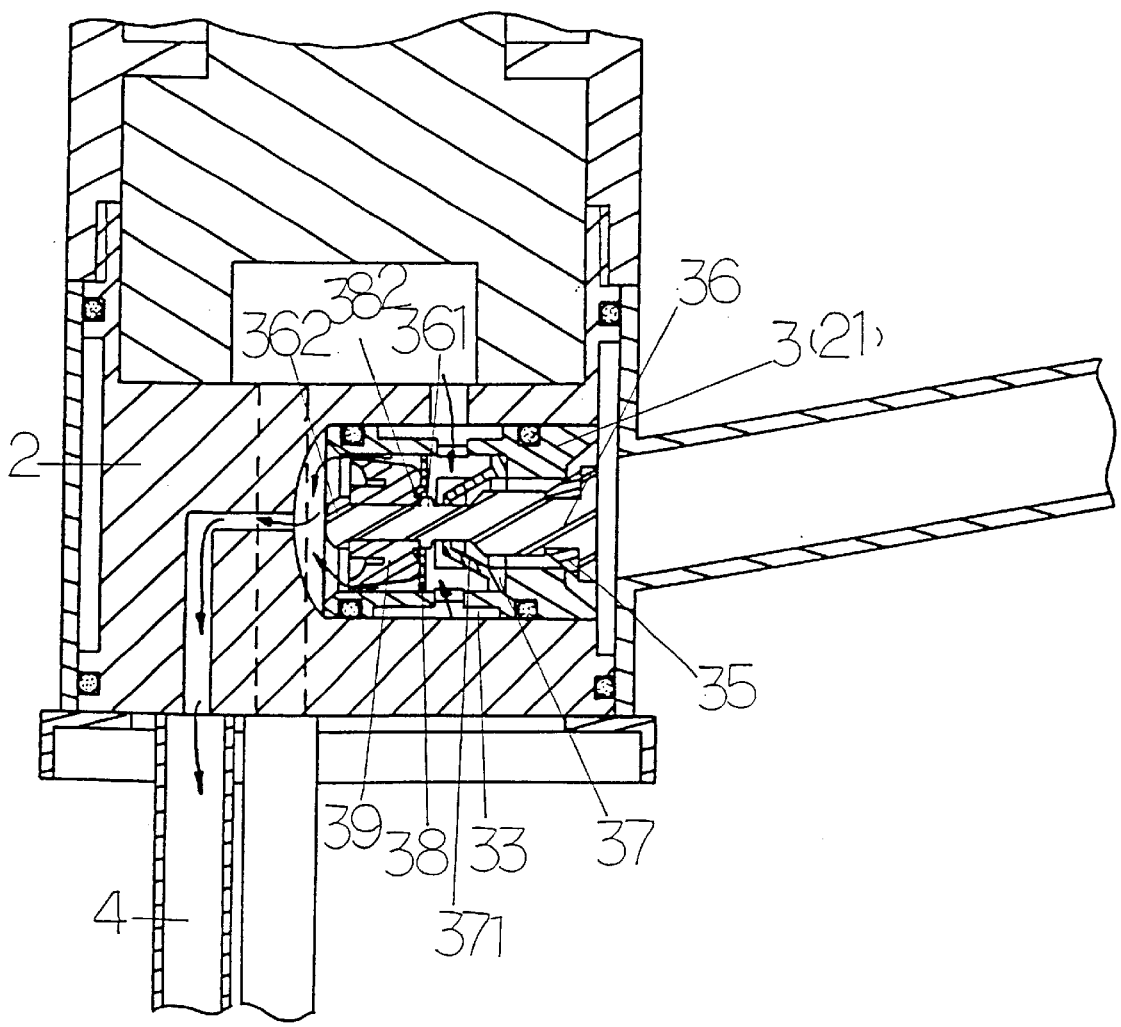
FIG. 4 shows another cross-section of the water splitter of the water tap according to the present invention when it is partially in use.
Figure 5:
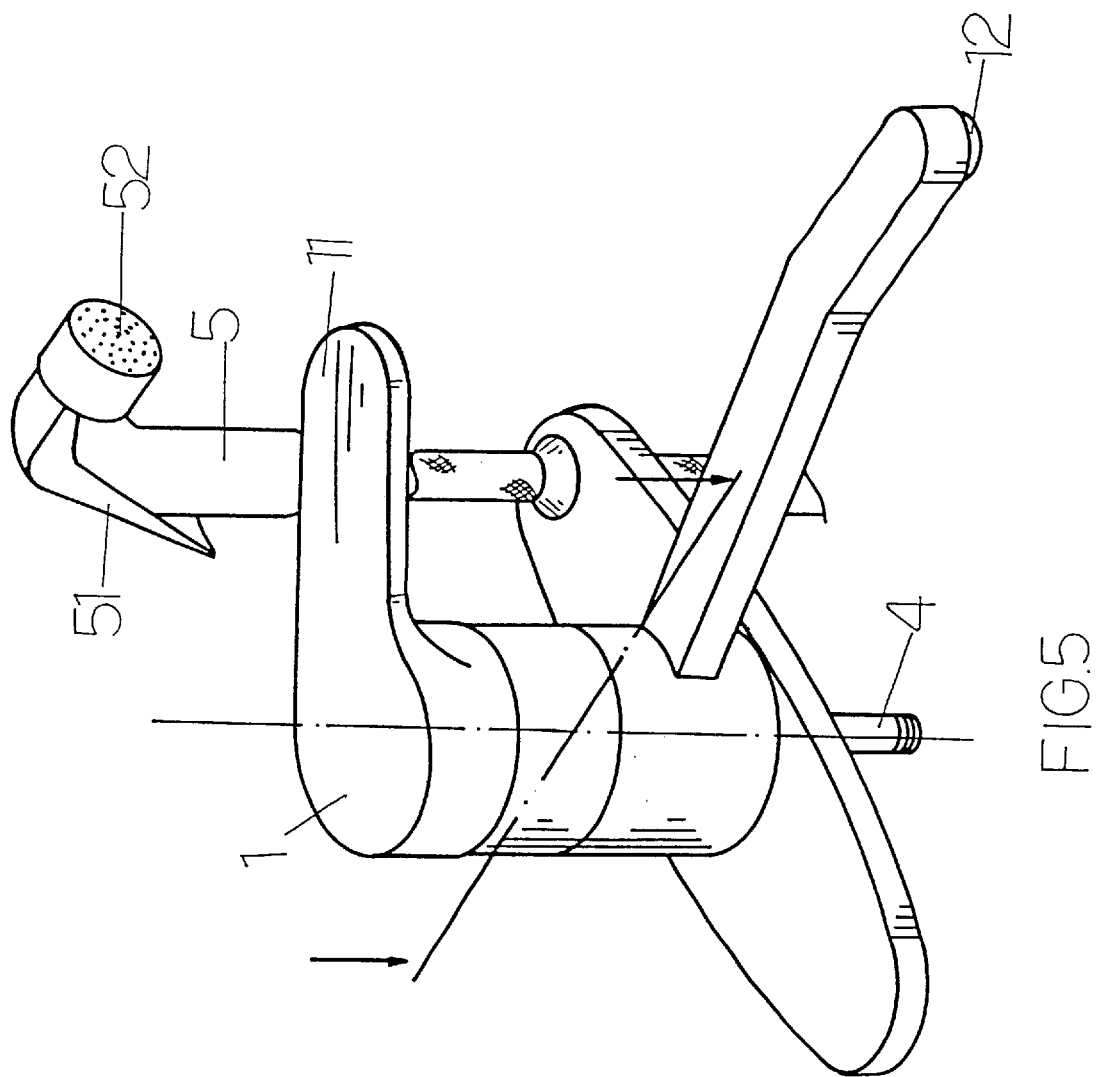
FIG. 5 is the three dimensional external appearance of the assembled water splitter of the water tap according to the present invention.

Please refer to FIG. 4. It shows a water passage splitter structure of a water tap according to the present invention. On the contrary, when the switch 51 of the water sprinkler 5 is on, the pressure of the water flow makes the valve rod 36 at one end of the water splitting valve element 3 close, and the other end of the internal water stopper 36 open such that the water will flow in the direction from the outlet 52 of the water sprinkler 5.

Therefore in summation of the above description, the present invention herein prevents leakage in the conventional structure and changes the direction of the water flow. It further complies with the patent application requirements and is submitted to the Patent and Trademark Office for review and granting of the commensurate patent rights.

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A water passage splitter structure of a water tap, said water passage splitter structure being disposed in a valve of the water tap, and comprising:

a valve element;

a valve rod disposed inside the valve element;

a choke plate disposed on the valve rod and having a plurality of tiny protruding dots and a plurality of ring-like concave surfaces;

a baffle cover disposed on the valve rod;

an external water stopper disposed on the valve rod; and an internal water stopper disposed on the valve rod, the internal water stopper, choke plate, baffle cover, and external water stopper being arranged in sequential order from a front end to a back end of the valve element, the choke plate being disposed between the internal water stopper and the baffle cover inside the splitter structure, the choke plate increasing the water pressure on the valve rod to enhance the water passage and prevent leakage.

* * * * *